United States Patent
Mikkonen et al.

(10) Patent No.: US 8,623,504 B2
(45) Date of Patent: Jan. 7, 2014

(54) POLYSACCHARIDE-BASED PIGMENTS AND FILLERS

(75) Inventors: Hannu Mikkonen, Vtt (FI); Kaisa Putkisto, Vtt (FI); Soili Peltonen, Vtt (FI); Sari Hyvärinen, Vtt (FI); Kimmo Koivunen, Aalto (FI)

(73) Assignee: Teknologian Tutkimuskeskus VTT, Espoo (FI)

( * ) Notice: Subject to any disclaimer, the term of this patent is extended or adjusted under 35 U.S.C. 154(b) by 0 days.

(21) Appl. No.: 13/142,875

(22) PCT Filed: Dec. 30, 2009

(86) PCT No.: PCT/FI2009/051050
§ 371 (c)(1),
(2), (4) Date: Sep. 21, 2011

(87) PCT Pub. No.: WO2010/076392
PCT Pub. Date: Jul. 8, 2010

(65) Prior Publication Data
US 2012/0003477 A1    Jan. 5, 2012

(30) Foreign Application Priority Data
Dec. 31, 2008    (FI) ..................................... 20086261

(51) Int. Cl.
*B32B 5/16*    (2006.01)
(52) U.S. Cl.
USPC ......... 428/402; 428/323; 427/180; 106/207.1
(58) Field of Classification Search
USPC ................. 428/402, 323; 106/207.1; 427/180
See application file for complete search history.

(56) References Cited

U.S. PATENT DOCUMENTS

| 3,746,558 | A | * | 7/1973 | Berkhout | .................. 106/207.1 |
| 4,095,992 | A | | 6/1978 | Rudolph et al. | |
| 5,011,918 | A | | 4/1991 | Bilimers et al. | |

FOREIGN PATENT DOCUMENTS

| EP | 0610154 | A1 | | 8/1994 |
| EP | 1 215 216 | A1 | | 6/2002 |
| EP | 1215216 | | * | 6/2002 |
| GB | 1363625 | A | | 8/1974 |
| WO | WO 2004/031478 | A1 | | 4/2004 |
| WO | WO 2005/030844 | A1 | | 4/2005 |

OTHER PUBLICATIONS

"Uniplex 280 CG Sucrose Benzoate" Unitex Chemical Corporation, Cas No. 12738-64-6, http://www/unitexchemical.com/pdf/Uniplex280CG_TDS.pdf, issued Aug. 5, 1999, pp. 1-7.
International Search Report, PCT/FI2009/051050, Apr. 1, 2010.
Written Opinion, PCT/FI2009/051050, Apr. 1, 2010 (PCT/ISA/237).
Extended European Search Report, dated May 7, 2013, for Application No. 09836134.8.
Wolff et al., "The Acylation of Corn Starch, Amylose and Amylopectin", Journal of the American Chemical Society, vol. 73, No. 1, Jan. 19, 1951, pp. 346-349, XP055058625, ISSN: 0002-7863.

* cited by examiner

*Primary Examiner* — Leszek Killiman
(74) *Attorney, Agent, or Firm* — Birch, Stewart, Kolasch & Birch, LLP (57) ABSTRACT

Particles of a polysaccharide derivative, having at least one substituent with conjugated unsaturated bonds and exhibiting an index of refraction in excess of 1.50 and a method for the production thereof. In the method, the raw-material is suspended in an organic solvent to form a suspension, which is contacted with an organic reactant comprising a residue with conjugated unsaturated bonds; the raw-material and the organic reactant are reacted to form a derivative exhibiting ester or ether bond between the raw-material and the residue with conjugated unsaturated bonds; the polysaccharide derivative is dissolved in a solvent to form a solution; and the solution is contacted with a non-solvent to precipitate particles of the polysaccharide derivative. The invention provides lightweight, optically improved organic pigments and fillers based on renewable resources and which are recyclable by combustion or composting.

14 Claims, 9 Drawing Sheets

POLYSACCHARIDE-BASED PIGMENTS AND FILLERS

BACKGROUND OF THE INVENTION

1. Field of Invention

The present invention relates to coating pigments and fillers. In particular, the present invention concerns novel polysaccharide-based pigments and fillers and methods of preparing such products.

2. Description of Related Art

Coating pigments and fillers are used in papermaking for improving smoothness, brightness and opacity of fibre-based products. Reduced grammage of the paper products and the relative low cost of mineral components has led to increasingly larger proportions of inorganic materials being incorporated into the fibre-based products to maintain and improve the optical properties. Today, printing paper and board grades therefore contain considerable amounts of inorganic pigments and fillers. However, the inorganic (mineral) pigments increase the proportion of incombustible residues and impair the recyclability of the products in the deinking stage, in combustion and in composting.

For replacing mineral products as fillers and pigments, various synthetic, more easily combustible organic pigments have been suggested and provided. They are conventionally based on petroleum derivatives and are solely used in coatings mixed with inorganic pigment. Also some organic, modified polysaccharide-based pigments and fillers have earlier been proposed. In this respect, reference is made to the following published International Patent Applications: WO2005030844, WO2005030847, WO2006134211, WO2007003697, WO2007003699, WO2007082985.

The particular advantages of polysaccharide-based (e.g. starch-based) pigments and fillers are that they are based on a renewable raw-material source and can easily be recycled.

As noted above, pigments and fillers are often used for improving brightness and opacity. The optical properties and especially the light scattering capacity of the paper structure are affected by the size, shape, packing and optical character of the fibrous components, the pigmenting components and pores. Light reflects partially from surfaces that differ from their surroundings by their refractive index (RI). The refractive index is a fundamental physical constant related to the molecular structure, density and atomic polarizability of a material and describes the deceleration of the speed of light propagating in the material. Also the light absorption character of the material affects the refractive index.

Thus, in the structure of the papermaking fibres, or in a coating, improved light scattering potential is typically associated with pigmenting materials that possess higher values of refractive index than that of the fibres (and air in the pores).

The inorganic materials commonly used have a high refractive index (commonly designated the symbol "n") and, in particular, titanium dioxide (rutile) has an extremely high n-value of 2.76, whereas gypsum, kaolin, calcium carbonate and talc have n-values in the range from about 1.54 to 1.59. By contrast, the refractive indices of organic pigmenting materials inherently are close to that of cellulosic papermaking fibres, i.e. close to, but below, 1.5.

Based on the above, in view of the considerable advantages provided by organic particles based on renewable sources, there is a need for new polysaccharide-based pigments and fillers which have improved optical properties.

SUMMARY OF THE INVENTION

It is an aim of the present invention to provide novel polysaccharide-based materials, with improved optical properties for use as pigments and fillers, for example in paper and cardboard.

It is another aim to provide a method of producing polysaccharide-based pigments and filler with improved optical properties.

The present invention is based on the idea of incorporating into polysaccharides or polysaccharide based materials organic aromatic side groups or other substituents containing conjugated double bonds in order to modify the conformational structure of polysaccharides and to introduce portions of higher optical density to the material. In particular, the present invention provides for novel polysaccharide based particles, which comprise a polysaccharide derivative containing an organic substituent containing conjugated unsaturation and which has a refractive index greater than that of lignocellulosic or cellulosic fibres.

Generally, the present particles are suitable for use as pigments or fillers in fibrous products, such as paper and cardboard, as well as in insulation materials.

Considerable advantages are obtained with the present invention. Thus, the present invention provides lightweight, optically improved organic pigments and fillers based on renewable resources and which are recyclable by combustion or composting.

The optical properties of the novel polysaccharide-based pigments and fillers are improved by aromatic substitution: in experiments carried out on substitution synthesis and product analyses, aromatic derivatives of polysaccharide- and disaccharide-based materials have exhibited higher refractive indices than the original materials.

Surprisingly it was also found that substitution increases the hydrophobicity of organic materials, improving their suitability for filler and pigment use.

Additionally, according to a preferred embodiment, relatively large sized substituent groups have been employed. These have a plasticization effect on e.g. starch derivatives, an effect potentially advantageous for the strength and smoothness of calendered paper products containing the novel pigments and fillers.

The novel starch-based materials have been found to be suitable for the solution precipitation techniques (WO2005030844) developed for the manufacture of starch acetate pigments and fillers.

Next, the invention will be described more closely with the aid of a detailed description and a number of working examples.

BRIEF DESCRIPTION OF THE DRAWINGS

In the attached drawings.

DETAILED DESCRIPTION OF PREFERRED EMBODIMENTS

As indicated above, the present invention provides novel particles of polysaccharide-based pigmenting materials comprised of polysaccharide derivatives which are obtained through conjugated/aromatic substitution.

The particles can have a particle size which falls within the micron or submicron range, depending on the practical application of the particles. Thus, for filler use, for example in paper and cardboard and similar fibrous products, the average particle size is preferably about 0.5 to 50 um, in particular about 1 to 20 um, suitably about 1 to 15 um. As pigments, for example in coating of paper and cardboard and similar fibrous products, an average particle size of about 50 to 750 nm, in particular about 100 to 500 nm, typically about 300 nm, is particularly suitable.

The particles can exhibit generally, and in particularly for filler use, a porosity of about 0.01 to 5%, preferably about 0.1 to 2% is preferred, 0.25 to 1.0% being particularly interesting. The pore size is, according to one embodiment, 50 to 1000 nm, in particular 250 to 750 nm.

The particles typically y have an index of refraction higher than 1.50, and comprises polysaccharide derivative particles, the average particle size of which is approximately 50 to 750 nm, preferably about 90 to 250 nm.

The polysaccharide-based pigmenting materials are water-insoluble. In the present context, the term "water-insoluble" means that at a maximum merely minute amounts, typically less than 5% by weight, in particular less than 1% by weight, suitably less than about 0.5% by weight of the polysaccharide material will dissolve in water at room temperature.

Previously published uses of aromatic substituted polysaccharides, more specifically starch derivatives, have been in thermoplastics applications in blends with biopolymers to improve water resistance, in water-based dispersion adhesives and coatings forming transparent hard films on e.g. glass, metal and ceramic surfaces (DE 2 039 812), in paper and non-woven coating and sizing compositions (U.S. Pat. No. 3,746,558), in dispersant use or in controlled permeability coating uses (U.S. Pat. No. 4,095,992, EP 0 108 504).

The known uses of compounds containing conjugated (aromatic) structures include optical brightening agents or fluorescent whitening agents e.g. in textile, plastics and paper industry. The more specialized uses include authentication applications. The brightening function of certain aromatic compounds is based on absorption of light in the ultraviolet and violet region of the electromagnetic spectrum, and re-emission of light in the visible blue region. They make the materials look less yellow and enhance the overall amount of reflected light. Typical compounds used in the paper applications comprise of stilbene- and coumarin-based structures (EP 0 610 154). Similar brightening function incorporated into the organic pigments can be achieved through applicable aromatic substitution to the polysaccharide chain.

The present modified polysaccharides can be produced by reacting a suitable polysaccharide material with a derivatizing agent comprising conjugated unsaturation. Such a reagent is selected from the group of reactive compounds containing aromatic residues, reactive compounds containing residues with conjugated unsaturated bonds, and mixtures thereof.

The organic reactant can be selected from the group of radicals having a leaving group and an aromatic residue of 6 to 18 carbon atoms, an alicyclic residue having 6 to 12 carbon atoms and at least two conjugated unsaturated bonds, or a linear or branched aliphatic hydrocarbyl residue having at least two conjugated unsaturated bonds, or mixtures of two or more.

Typically the residue is an aryl group with 1 to 3 fused rings, optionally exhibiting 1 to 3 heteroatoms selected from oxygen, nitrogen and sulphur. Examples include benzoyl, naphthoyl, antracenoyl, stilbene and diphenyl. Residues can also be derived from heterocyclic compounds. Examples include furan, coumarin, benzofuran, thiophene, pyridine and compounds and derivatives thereof.

The present particles typically comprise an ester or ether of starch or cellulose having a degree of substitution with respect to the substituent with conjugated unsaturated bonds of 0.1 to 3, preferably about 0.2 to 2.5, in particular about 0.25 to 2.

The polysaccharide derivative exhibits a degree of substitution with respect to the second substituent of about 2.9 to 0.1, preferably about 2.8 to 0.5, in particular about 2.75 to 1.

The polysaccharide material used for chemical modification is generally selected from the group of native or modified starch, dextrin, native hemicellulose, native cellulose, poly (lactic acid), polylactides, polycaprolactone, starch derivatives, dextrin derivatives, hemicellulose derivatives, cellulose derivatives, and mixtures thereof. In particular, the polysaccharide material comprises native starch, starch esters or ethers, mixed starch esters, or starch ethers/esters. Other suitable polysaccharide materials include dextrin and cellulose or cellulose ethers or esters or mixed ethers and esters.

Starches and esters and ethers and mixed ester and ethers are particularly suitable polysaccharide materials. Cellulose acetate, cellulose propionate or cellulose butyrate or mixtures or mixed esters thereof are examples of cellulose derivatives.

For producing the polysaccharides modificates disclosed above, esterification of native polysaccharides or polysaccharide derivatives, or by transesterification of esterified starches can be employed. The modificates can also be obtained by etherification of native polysaccharides or polysaccharide derivatives.

As method above, the native polysaccharides or polysaccharide derivatives can also be transglycosylated. Typically, transglycosylation products are obtained from native starch or a starch derivative (or corresponding other polysaccharide product), by reacting starch or the starch derivative with an alcohol, such as methanol, butanol, ethylene glycol, propylene glycol or glycerol, at acid conditions, whereby there are formed alkyl glycoside compounds, which can be called "transglycosylation" products. In these, an alkyl or hydroxyalkyl group is linked through an ester bond to C-1 of the anhydroglucose unit.

Methods of producing transglycosylated derivatives are disclosed in WO03/068823 and U.S. Pat. No. 7,264,666, the contents of which are herewith incorporated by reference.

The advantage of subjecting the polysaccharide or polysaccharide derivative to chemical modification by, e.g., enzymatic or acid hydrolysis or transglycosylation is that due to a lowering of the molecular weight, the products obtained by the present invention will be more readily soluble which gives an opportunity to increase the solids content of a pigment slurry containing them.

In the particles according to the present invention, the modified polysaccharide can also comprise, in addition to a first substituent of the above kind, a second substituent bonded by ester or ether bonds to the polysaccharide. This second substituent typically comprises one or more hydrocarbyl radicals derived from $C_{2-20}$ aliphatic groups.

Typically, the esterification or etherification with one or several organic reactants of the above kind takes place in a suspension of the polysaccharide in an organic liquid, preferably a hydrocarbon liquid or a non-polar organic base which is capable of working as a reaction medium for the reactant.

The temperature of the reaction is about +5 to +150° C., preferably about +15° C. up to the boiling point of the solvent. The reaction time is 1 min to 24 hours, typically about 10 minutes to 10 hours. The reaction can be carried out under agitation.

After the completion of the reaction, the polysaccharide derivatives are recovered from the reaction mixture, or the reaction mixture is used as such for producing nano-sized particles.

From the obtained derivatives, nanosized particles can be produced as disclosed in, e.g., WO2005030844. "Nanosized" means generally particles having an average molecular weight in the range of about 50 to 950 nm, typically about 75 to 900 nm, in particular about 80 to 800 nm, for example about 100 to 500 nm.

Briefly, according to such a method, the modified polysaccharide is first dissolved in a solvent, particularly in one or in a mixture of two or more organic solvents, or in a mixture of one or several organic solvents and water. As a result, a solution is obtained, the concentration of polysaccharide derivative in which is at least 1% by weight, preferably a maximum of approximately 40% by weight and typically approximately 10-30% per weight.

Preferably, the polysaccharide derivative is completely dissolved in the chosen solvent, but it is also possible to proceed by dissolving only a part of the material in the solvent and to leave a part insoluble form. In this case, during the precipitation stage (see below) which follows the dissolving stage, the dissolved part is precipitated as a mixture with the insoluble part, generating a composite product which comprises both material containing the original granule structure, and precipitated material which comprises either spherical particles or a microporous material. The relative percentages of the insoluble and the dissolved initial material (as weight fractions) can be approximately 10:90 . . . 90:10, preferably approximately 20:80 . . . 80:20, most suitably approximately 30:70 . . . 70:30.

According to a preferred embodiment of the method, the viscosity of the solution (or the solution fraction) is near the viscosity of water, or maximum 1.5-5, typically maximum 4-5 times higher.

In an embodiment, in which it is desired to dissolve all the initial material, according to the present invention, a perfectly suitable solvent or solvent mixture is used, which can be blended in all proportions with water. Preferably, the solvent is volatile and, consequently, easy to distill. "A perfect solvent" means a solvent system in which the solvent in question acts as a plasticizer of the polysaccharide derivative.

Suitable solvents are straight-chained, branched and cyclic ketones, such as acetone and tetrahydrofurane, and alkanoic acids, such as acetic acid. Further solvents are mono-, di- and polyols, such as ethylene glycol, diethyl glycol and ethoxy ethyl glycol, and other kinds of organic solvents, such as ethyl and methyl formate, pyrrolidone and dimethylsulphoxide.

In the second stage, the solution obtained in the first stage is contacted with a precipitation agent (non-solvent). The non-solvent is a material which does not meet the above-stated definition of a polysaccharide derivative solvent, which means that it is an agent capable of precipitating as totally as possible the polysaccharide derivative in the solution, when there is a large enough quantity of that solution in the liquid system. Generally, at least 70% by weight of the polysaccharide derivative in the solution is precipitated, preferably at least 80% by weight and more preferably 90% by weight, even at least 95% by weight. Depending on the solvent or the solvent solution, the quantity of the non-solvent is generally 0.1 to 100 times the quantity of the solvent or the solvent solution (calculated by weight), preferably approximately 0.5 to 10 times, most suitably approximately 0.7 to 5 times.

Conventionally the precipitation agent comprises or is formed by water or a corresponding polar liquid, such as a $C_{1-6}$-alkanol, or a non-polar hydrocarbon, such as a$C_{4-20}$-alkane, preferably a $C_{5-10}$-alkane, or a mixture of alkanes.

Spherical particles, the particle size (average diameter size) of which is 90-1000 nm, preferably less than approximately 500 nm, more preferably less than 400 nm, particularly less than 350 nm, are formed spontaneously, when the polysaccharide solution is diluted with water or a corresponding non-solvent. The dilution can take place rapidly and turbulently (under intensive agitation). It can also take place slowly, in which case the two liquids are mixed with each other such that no boundary layers originated from density differences of liquids are formed.

Based on the above, the present invention provides a method of producing a nano-sized particles comprising a polysaccharide derivative which is essentially insoluble in water, according to which method
    a polysaccharide raw-material is provided,
    the raw-material is suspended in an organic solvent to form a suspension,
    the suspension is contacted with an organic reactant comprising a residue with conjugated unsaturated bonds, the raw-material and the organic reactant are reacted at conditions conducive to the formation of an ester or ether bond between the raw-material and the residue with conjugated unsaturated bonds to form a polysaccharide derivative with substituents derived from the organic reactant, the polysaccharide derivative is dissolved in a solvent to form a solution, and the solution is contacted with a non-solvent to precipitate nano-sized particles of the polysaccharide derivative.

Depending on the degree of substitution, the particles generally have a refraction index of at least 1.51, in particular 1.52 or more. Values of 1.55 or even more are possible.

To mention some specific examples, one particular embodiment of the invention comprises starch benzoate. The degree of substitution (DS) of the benzoate group can vary in the range from about 0.5 to 3.0, in particular 0.7 to 2.5.

Another embodiment comprises starch acetate benzoate. The DS of the acetate group can be in the range of about 1.5 to 2.5 and the DS of the benzoate about 0.5 to 1.5.

A third particular embodiment of the invention comprises starch naphthanoate. The degree of substitution (DS) of the naphthanoate group can vary in the range from about 0.5 to 3.0, in particular 0.7 to 2.5.

A fourth embodiment comprises starch acetate naphthanoate. The DS of the acetate group can be in the range of about 1.5 to 2.5 and the DS of the naphtanoate about 0.5 to 1.5.

The following exemplifying (typical) data on the refractive indices of various polysaccharide derivatives can be given; the RIs of the materials has been estimated using the immersion liquid method with optical microscope:

Hydrolyzed potato starch: n~1.50
Starch acetate ($DS_{ACET} \geq 2$): 1.45<n<1.50
Starch acetate benzoate ($DS_{ACET}$~2, $DS_{BZ}$~1): 1.50<n<1.55
Starch benzoate ($DS_{BZ}$~3): 1.55<n<1.60
Starch acatate naphthanoate $DS_{ACET}$~2, $DS_{NF}$~1: 1.50<n<1.55
Starch naphthanoate ($DS_{NF}$~2): n~1.65.

Starch benzoate produced in aqueous dispersion having a particle size typical of paper and cardboard fillers was tested as a filler in test papers at loadings ranging from about 5 to about 30% (calculated from the weight of the fibres). Calcium carbonate was employed as a reference. The test results indicated the excellent optical and mechanical properties obtainable with relatively high loadings (10% by weight up to about 30% by weight) of the present fillers.

In the tests carried out, with starch benzoate having a particle size (average size) of about 0.5 to 2.0 microns, the ISO brightness increased from 86% to 90% when the filler loading was increased from about 9% by weight to 28% by weight, and the light scattering coefficient increased from 50 $m^2$/kg to about 100 $m^2$/kg and opacity from 83% to about 90%. The tensile strength remained good even at high filler loadings (tensile index was reduced from 40 Nm/g to 23 Nm/g) and delamination strength (expressed as Huygen bond) remained at least on the same level as for traditional fillers (decrease from 160 J/$m^2$ to 80 J/$m^2$).

Example 1

Preparation of Starch Benzoate

A series of starch benzoates was prepared with varying reaction times and temperatures. Dried hydrolyzed potato starch (St) was suspended in pyridine. Benzoyl chloride (Bz-Cl) ($C_6H_5COCl$, 140.57 g/mol) was added to the suspension at room temperature and the reaction was carried out at elevated temperature for varying reaction times. The product was isolated and washed with warm ethanol (~30° C.). The products were analyzed for solubility, glass transition temperature ($T_g$, detected at the second heating time) using Differential Scanning calorimetry, thermal decomposition ($T_{10\%}$, temperature at 10% weight loss) using Thermogravimetry, and the aromatization was confirmed with FT-IR spectroscopy and the average degree of substitution ($DS_{Bz}$) was analyzed with Nuclear Magnetic Resonance spectroscopy (NMR). The evaluation of refractive index (RI) of the dried powdery materials was carried out using the so-called Becke line test that employs transmission polarization microscopy and a set of immersion liquids of known refractive indices. The preparation conditions and analysis results are summarized in Table 1.

TABLE 1

Preparation conditions, yield and characteristics of starch benzoates

| Sample id | Starch/Bz-Cl/ pyridine, g/g/ml | Reaction temp./time, ° C./hours | Yield/Solids content, g/% | $DS_{Bz}$ | $T_g/T_{10\%}$, ° C./° C. | RI |
|---|---|---|---|---|---|---|
| St | — | — | — | 0 | —/298 | ~1.50 |
| St-Bz 206 | 20/79.5/150 | 105/3 | 58/97 | 2.97 | 151/349 | 1.55-1.60 |
| St-Bz 306 | 20/79.5/150 | 105/3 | 58/95 | 2.57 | 150/343 | ~1.55 |
| St-Bz 507 | 20/79.5/80 | 65/3 | 56/97 | — | 151/340 | 1.55-1.60 |
| St-Bz 607 | 10/38.8/75 | 25/24 | 11/92 | — | — | 1.50-1.55 |
| St-Bz 707 | 50/199/200 | 65/3 | 130/95 | n.a. | 149/339 | ~1.55 |

Figure 1:
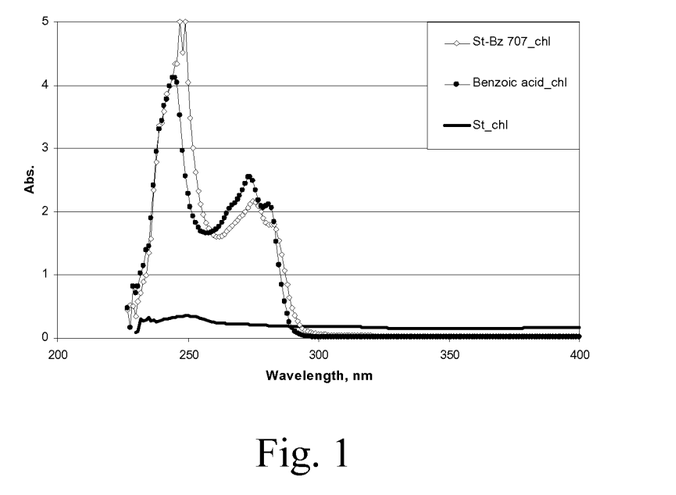
FIG. 1 shows the UV-Vis absorption spectra of unsubstituted starch (ca. 0.5 mg/ml), benzoic acid (ca. 0.5 mg/ml) and St-Bz 707 (ca. 0.5 mg/ml) in chloroform.

The products were insoluble in water and soluble in acetone, toluene, tetrahydrofuran, chloroform and in heated dimethylsulfoxide. Compared to the FT-IR spectrum of the starting starch, the spectra of the starch benzoylation products contained the characteristic absorption bands at wave numbers ranging from 1550 to 1600 $cm^{-1}$ and from 680 to 715 $cm^{-1}$ (aromatic) and from 1080 to 1150 $cm^{-1}$ and from 1250 to 1330 $cm^{-1}$ (aromatic ester). An exception was product St-Bz 607, which apparently was not esterified under the used conditions. Compared to the measured decomposition temperature 298° C. of the starting starch, the $T_{10\%}$ of the starch benzoates was significantly higher. The UV-Vis absorption spectrum (recorded with Shimadzu UV2501PC) of a starch benzoate derivative (St-Bz 707) exhibited absorption wavelengths characteristic to phenyl compounds, such as benzoic acid, but which were not observed for unsubstituted starch.

FIG. 1 shows the UV-Vis absorption spectra of unsubstituted starch (ca. 0.5 mg/ml), benzoic acid (ca. 0.5 mg/ml) and St-Bz 707 (ca. 0.5 mg/ml) in chloroform.

The estimated values of RI for the products appeared to vary with the preparation conditions and thus with the degree of substitution (Table 1). For comparison, evaluated RI values of water insoluble starch acetates ($DS_{Acet} \geq 2$) settled between 1.45 and 1.50 (Example 7).

Example 2

Preparation of Starch Acetate Benzoate

Acetylated starch (SA) (average $DS_{Acet}$ 2) was benzoylated in a similar system as used in Example 1. The SA product was transglycosylated as described in WO03/068823. The preparation conditions and analysis results are summarized in Table 2.

TABLE 2

Preparation conditions, yield and characteristics of starch acetate benzoate

| Sample id | Starch acetate/ Bz-Cl/pyridine, G/g/ml | Reaction temp./time, °C./hours | Yield/Solids content, g/% | $DS_{Bz}$ | $T_g/T_{10\%}$, °C./°C. | RI |
|---|---|---|---|---|---|---|
| SA | — | — | — | 0 | 113; 158/338 | 1.45-1.50 |
| SA-Bz 106 | 20/26.5/150 | 105/3 | 23/96 | 0.9 | 145/344 | 1.50-1.55 |

The product was insoluble in water and soluble in acetone, toluene, tetrahydrofuran, chloroform and dimethylsulfoxide. Compared to the FT-IR spectrum of the starting starch acetate, the spectra of the starch acetate benzoylation product contained the characteristic absorption bands of aromatic compounds.

The estimated value of RI for the product appeared to be somewhat higher than that obtained for the starting starch acetate.

Example 3

Preparation of Sucrose Benzoate

A disaccharide, sucrose (table sugar) was benzoylated in a similar system as used in Example 1. The preparation conditions and analysis results are summarized in Table 3.

TABLE 3

Preparation conditions, yield and characteristics of sucrose benzoate.

| Sample id | Sucrose/Bz-Cl/ pyridine, g/g/ml | Reaction temp./time, °C./hours | Yield/Solids content, g/% | $DS_{Bz}$ | $T_g/T_{10\%}$, °C./°C. | RI |
|---|---|---|---|---|---|---|
| Sucrose | — | — | — | 0 | — | 1.50-1.55 |
| Sucrose-Bz 107 | 10/40/40 | 65/3 | 17/96 | 3.5 | 50/360 | 1.55-1.60 |

The product was insoluble in water and soluble in acetone, toluene, tetrahydrofuran, chloroform and dimethylsulfoxide. The FT-IR spectrum of the sucrose benzoylation product contained the characteristic absorption bands of aromatic compounds. The estimated value of RI for the product appeared to be somewhat higher than that obtained for the starting disaccharide.

Example 4

Preparation of Diphenylacetyl Starch

Diphenylacetyl starch was prepared in an inert reaction system ($N_2$ atmosphere) using a catalyst. Dried hydrolyzed potato starch (St) was suspended in pyridine. Diphenylacetyl chloride (DPA-Cl) (($C_6H_5$)$_2$CHCOCl, 230.69 g/mol) and a catalyst 4-dimethylaminopyridine (DMAP) ($NC_5H_4N$ ($CH_3$)$_2$), 122.17 g/mol) were added to the suspension at room temperature and the reaction was carried out at elevated temperature. The product was isolated and washed with warm water (~30° C.). The preparation conditions and analysis results are summarized in Table 4.

TABLE 4

Preparation conditions, yield and characteristics of diphenylacetyl starch

| Sample id | Starch/DPA-Cl/ DMAP/pyridine, g/g/ml | Reaction temp./time, °C./hours | Yield/Solids content, g/% | $DS_{DPA}$ | $T_g/T_{10\%}$, °C./°C. | RI |
|---|---|---|---|---|---|---|
| St-DPA 108 | 5/17.7/1.87/80 | 80/8 | 14.8/92 | n.a. | 37/271 | ~1.55 |

The products were insoluble in water and soluble in acetone, tetrahydrofuran, chloroform and dimethylsulfoxide. Compared to the FT-IR spectrum of the starting starch, the spectrum of the diphenylacetyl starch product contained the characteristic absorption bands of aromatic compounds. The estimated value of RI for the product appeared to be somewhat higher than that obtained for the starting starch.

Example 5

Preparation of Starch Naphthanoate and Starch Acetate Naphthanoate

A series of starch naphthanoates and a starch acetate naphthanoate was prepared with varying reaction times and temperatures. Dried hydrolyzed potato starch (St) was suspended in pyridine. Naphthoyl chloride (Naf-Cl) ($C_{10}H_7COCl$, 190.63 g/mol) was added to the suspension at room temperature and the reaction was carried out at elevated temperature for varying reaction times. The product was isolated and washed with warm ethanol (~30° C.). Alternatively, an acetylated starch (SA) (average $DS_{Acet}$ 2) was used as the starting material. The preparation conditions and analysis results are summarized in Table 5.

TABLE 5

Preparation conditions, yield and characteristics of starch naphthanoates

| Sample id | Starch/Naf-Cl/pyridine, g/g/ml | Reaction temp./time, °C./hours | Yield/Solids content, g/% | $DS_{Naf}$ | $T_g/T_{10\%}$, °C./° C. | RI |
|---|---|---|---|---|---|---|
| St-Naf 107 | 3.24/16/30 | 65/3 | 3/91 | n.a. | n.a. | 1.50-1.55 |
| St-Naf 207 | 3.24/16/30 | 65/7 | 12/94 | 2.0 | 112/328 | ~1.65 |
| St-Naf 307 | 3.24/8.62/30 | 65/7 | 6/98 | 1.15 | 121/280 | 1.60-1.65 |
| SA-Naf 407 | 3.2/5.4/30 | 65/7 | 3.5/93 | 1.2 | 140/347 | 1.50-1.55 |

The products were insoluble in water and soluble in acetone, tetrahydrofuran, chloroform and dimethylsulfoxide. The product after a three hour reaction time (St-Naf 107) did not indicate aromaticity by FT-IR or NMR. Compared to the FT-IR spectrum of the starting starch, the spectra of the starch naphthoylation products prepared at longer reaction times contained the characteristic absorption bands at wave numbers ranging from 1450 to 1650 $cm^{-1}$ and from 750 to 810 $cm^{-1}$ (aromatic) and from 1080 to 1150 $cm^{-1}$ and from 1250 to 1330 $cm^{-1}$ (aromatic ester). The UV-Vis absorption spectrum of a starch naphthanoate derivative (St-Naf 207) exhibited absorption wavelengths characteristic to conjugated compounds, but which were not observed for unsubstituted starch (FIG. 2).

Figure 2:
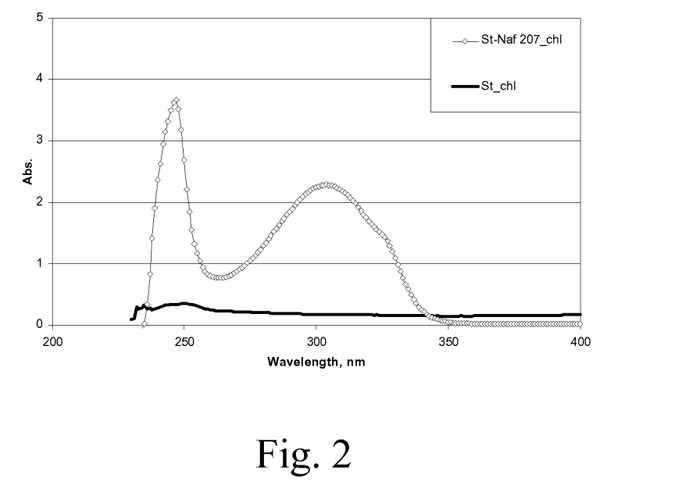
FIG. 2 shows the UV-Vis absorption spectra of unsubstituted starch (ca. 0.5 mg/ml) and St-Naf 207 (ca. 0.5 mg/ml) in chloroform.

FIG. 2 indicates the UV-Vis absorption spectra of unsubstituted starch (ca. 0.5 mg/ml) and St-Naf 207 (ca. 0.5 mg/ml) in chloroform.

As will appear, the estimated values of RI for the products vary with the preparation conditions and thus with the degree of substitution (Table 5).

Example 6

Preparation of Water Dispersion (Coating Pigment) of Starch Benzoate

Fine-sized coating particle dispersion of a synthesized aromatic starch derivative was prepared similarly to methods described in (WO2005030844). 6 g of the starch benzoate St-Bz 206 (synthesized according to Example 1) was dissolved in 200 ml of acetone under mixing. When the starch benzoate was totally dissolved, 120 ml of water (added with a dispersing additive, Kemira A41) was added in small batches into the solution during a period of few minutes. After a cloud point concentration was reached, an additional volume of 280 ml water was mixed into the solution very rapidly to precipitate the starch derivative. A turbid white, stabile emulsion was formed. Acetone was evaporated under stirring. The product was centrifuged and the precipitate washed with water. Finally, the product was stored as a stable dispersion at a solid content of 20 wt-%.

A sample of the prepared dispersion was dried to form fine-sized white powder. The product was evaluated for RI in immersion method: the resulting RI range was similar to that estimated for the starting derivative, being at 1.55-1.60.

Example 7

Preparation of Water Dispersions (Filler Pigment) of Starch Benzoate, Starch Acetate Benzoate, Starch Naphthanoate and Starch Acetate Naphthanoate Fine structured filler particle dispersions of the synthesized aromatic starch derivatives were prepared similarly to methods described in (WO2005030844). A starch derivative (synthesized according to Examples 1, 2, or 5) was dissolved in a 50/50 wt-% mixture of acetone/tetrahydrofuran at a solids content of 6 wt-%. A four times larger volume of water was stirred under constant forceful mixing and a dispersing additive (Kemira A41) was added. The polymer solution was added to the mixed water in small batches to form a turbid white dispersion. The organic solvents were evaporated from the dispersion under mixing. The product was centrifuged and the precipitate washed with water. Finally, the stabile water dispersion was prepared at a solids content range from approx. 10 to 20 wt-%, depending on the batch.

Figure 3:
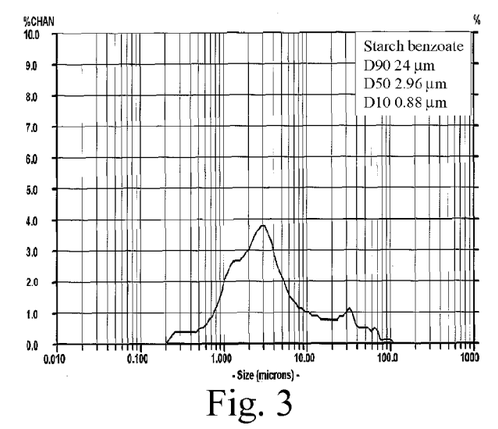
FIG. 3 shows the particle size distribution of starch benzoate filler (based on St-Bz 707) particle dispersion prepared according to Example 6.

The particle size distribution of a prepared starch benzoate filler (based on St-Bz 707 according to Example 1) was evaluated in water using laser diffraction analyzer (Lecotrac LT100). Measured after ultrasonic dispersal, the average particle size (by volume) was 8.1 μm, and the characteristic distribution figures were: D90 24 μm, D50 2.96 μm and D10 0.88 μm (FIG. 3). By Scanning Electron Microscopy (SEM) analysis, the structure of dried starch benzoate filler was porous, formed by agglomerated submicrometer spherical particles (FIG. 4).

Figure 4A:
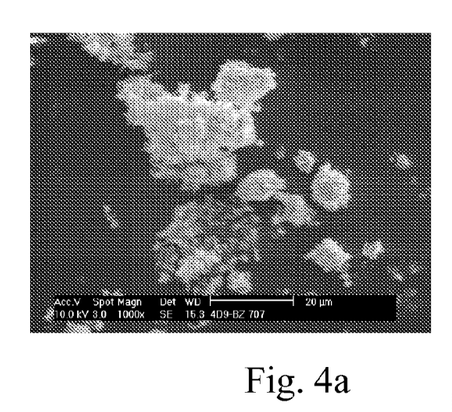
FIG. 4 shows the SEM analysis of structure of dried starch benzoate filler (based on St-Bz 707) prepared according to Example 6. Scale bars of 20 µm (left) and 2 µm (right)
Figure 4B:
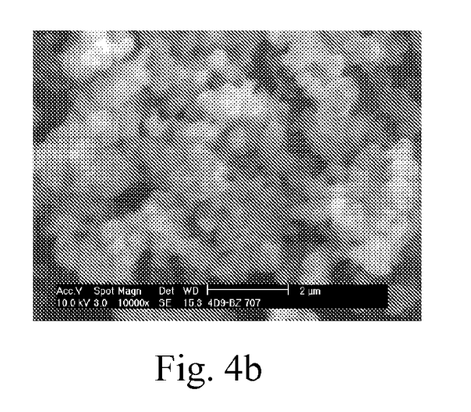

FIG. 3 shows the particle size distribution of starch benzoate filler (based on St-Bz 707) particle dispersion prepared according to Example 7 and FIG. 4 indicates the SEM analysis of structure of dried starch benzoate filler (based on St-Bz 707) prepared according to Example 7. Scale bars of 20 μm (left) and 2 μm (right).

A sample of the prepared starch benzoate filler dispersion was dried to form white powder. The product was evaluated for RI in immersion method: the resulting RI range was similar to that estimated for the starting derivative, being at 1.55-1.60.

A SEM analysis of a prepared and dried starch naphthanoate filler (based on St-Naf 207 according to Example 5) proved a porous structure resulting from aggregation of submicrometer and micrometer sized particles (FIG. 5).

Figure 5A:
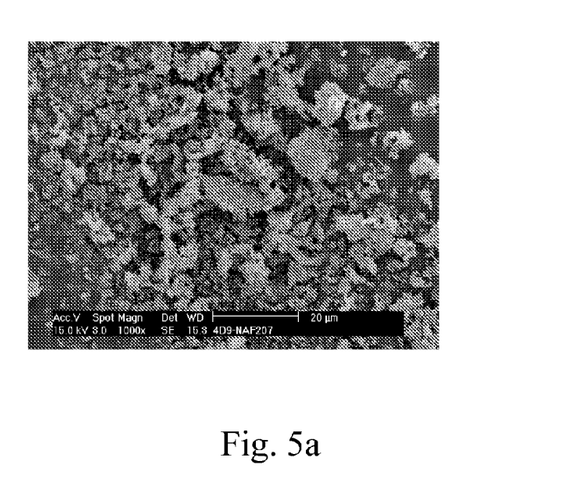
FIG. 5 shows the SEM analysis of structure of dried starch naphthanoate filler (based on St-Naf 207) prepared according to Example 6. Scale bars of 20 μm (left) and 2 μm (right)
Figure 5B:
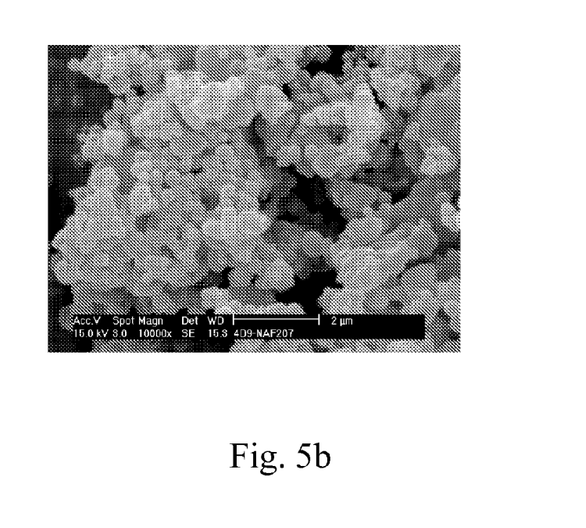

FIGS. 5A and 5B show the SEM analysis of structure of dried starch naphthanoate filler (based on St-Naf 207) prepared according to Example 7. Scale bars of 20 µm (left) and 2 µm (right).

A sample of the prepared starch naphthanoate filler dispersion was dried to form white powder. The product was evaluated for RI in immersion method: the resulting RI range was similar to that estimated for the starting derivative, being approx. at 1.65.

Example 8

Preparation of Water Dispersion (Filler Pigment) of Starch Acetate for Reference in Filler Tests Fine structured filler particle dispersion of a starch acetate (St-Acet with $DS_{Acet} \geq 2$) was prepared similarly to methods described in (WO2005030844). For acetylation, the starch, acetic acid and acetic acid anhydride were mixed with sodium acetate catalyst and let to react at elevated temperature (around 125° C.). The esterified product was precipitated with water and washed with water, then dried. The acetylated starch derivative was dissolved in acetone at a solids content of 6 wt-percent. A four times larger volume of water was stirred under constant forceful mixing and a dispersing additive (Kemira A41) was added. The polymer solution was added to the mixed water in small batches to form a turbid white dispersion. The organic solvent was evaporated from the dispersion under mixing. The product was centrifuged and the precipitate washed with water. Finally, the stabile water dispersion was prepared at a solids content of approx. 10 wt-%.

A SEM analysis of prepared and dried starch acetate filler according to Example 8 proved a porous structure resulting from aggregation of submicrometer and micrometer sized particles (FIG. 6).

Figure 6A:
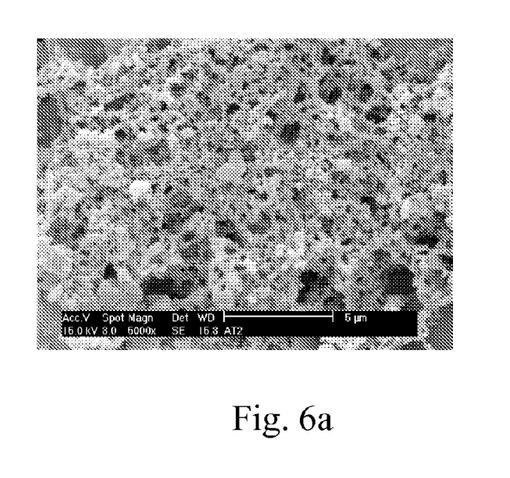
FIG. 6 shows the SEM analysis of structure of dried starch acetate filler (based on St-Acet) prepared according to Example 7. Scale bars of 5 μm (left) and 1 μm (right)
Figure 6B:
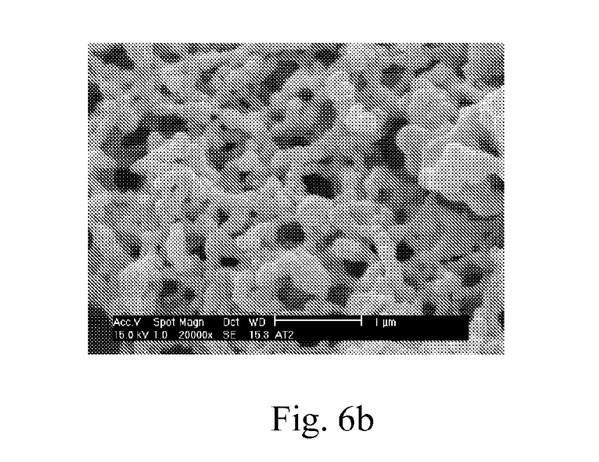

FIGS. 6A and 6B show the SEM analysis of structure of dried starch acetate filler (based on St-Acet) prepared according to Example 8. Scale bars of 5 µm (left) and 1 µm (right).

A sample of the prepared starch acetate filler dispersion was dried to form white powder. The product was evaluated for RI in immersion method: the resulting RI range was 1.45-1.50.

Example 9

Use of Dispersed Starch Acetate and Starch Benzoate as Paper Fillers and Filled Paper Properties A starch benzoate filler (based on St-Bz 707) prepared according to Example 7 was used as an organic filler in hand sheets at varying dosage. For reference, a starch acetate (based on St-Acet) filler prepared according to Example 8 was used. As inorganic reference fillers, commercial grades of a ground calcium carbonate (chalk), a scalenohedral precipitated calcium carbonate (PCC) and a titanium dioxide-coated mica (pearlescent) were used. Dried pulp (70% birch, 30% pine) was beaten to a tensile strength index around 50 Nm/g and was used as the furnish. The fillers were mixed with the furnish in a sheet mould at the precalculated dosage, targeting at a total grammage of 60 g/m². Retention agent was not used. The sheets were drum dried and air-conditioned prior to analyses.

Figure 7:
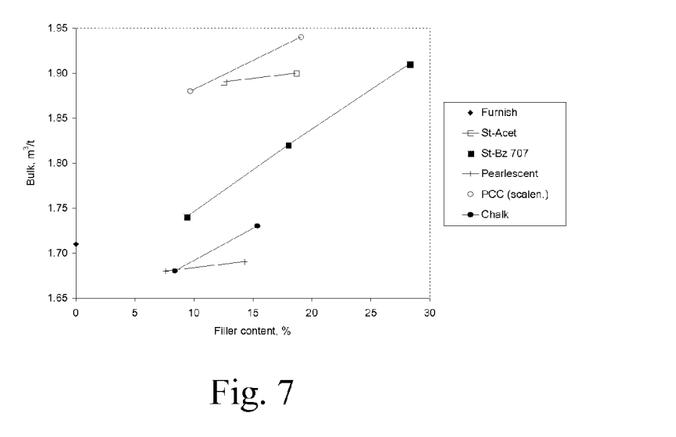
FIG. 7 shows the bulk of the sheets filled with starch-based and inorganic fillers.

Compared to the sheets prepared with chalk and pearlescent fillers, the bulk of the sheets with starch-based fillers were higher at similar dosage levels on the weight basis (FIG. 7). Higher bulk was obtained with PCC at the used dosage levels. Sheets formed with St-Acet based filler gave higher bulk than those filled with St-Bz 707.

FIG. 7 gives a graphical depiction of the bulk of the sheets filled with starch-based and inorganic fillers.

The light scattering coefficient was higher for the inorganic filler containing sheets than measured for the St-Acet filled structure. Improved light scattering was observed for the sheets filled with St-Bz 707 (FIG. 8).

Figure 8:
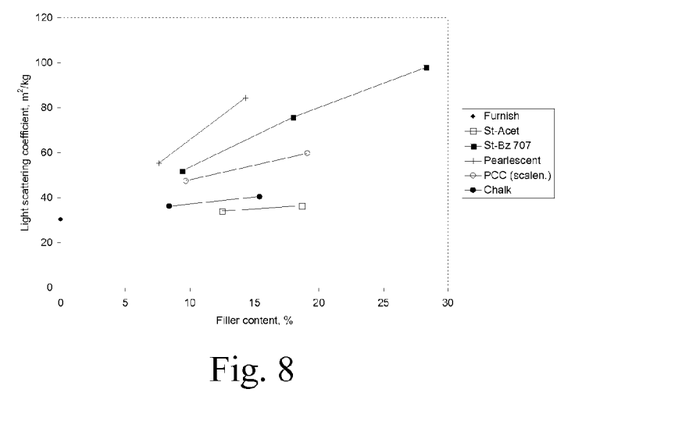
FIG. 8 shows the light scattering coefficient of the sheets filled with starch-based and inorganic fillers.

FIG. 8 shows the light scattering coefficient of the sheets filled with starch-based and inorganic fillers.

Figure 9:
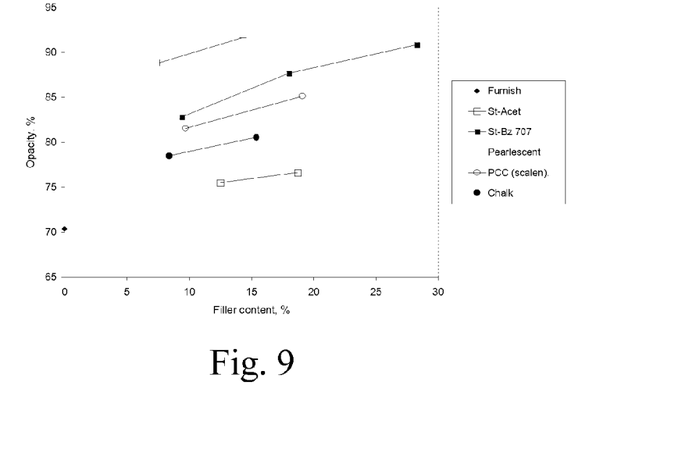
FIG. 9 shows the opacity of the sheets filled with starch-based and inorganic fillers.

Opacity of the sheets improved less with the St-Acet based filler than with inorganic fillers. Improved opacity levels were achieved with St-Bz 707 as will appear from FIG. 9 showing the opacity of the sheets filled with starch-based and inorganic fillers. ISO Brightness of the sheets with starch-based fillers, especially those based on St-Bz 707, were comparable to those observed for the PCC-containing sheets at similar dosage levels.

Figure 10:
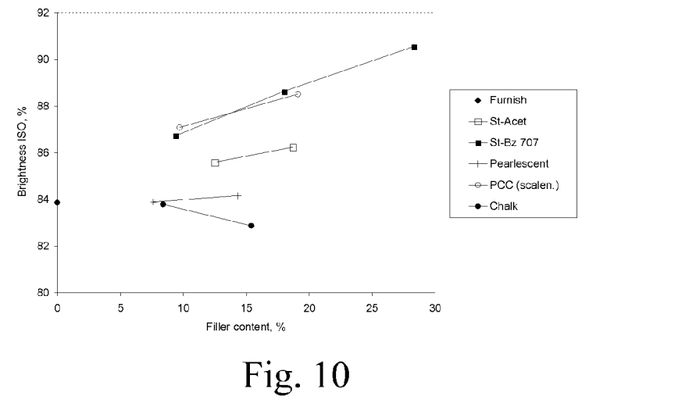
FIG. 10 indicates the ISO Brightness of the sheets filled with starch-based and inorganic fillers.

In the latter respect reference is made to FIG. 10 showing ISO Brightness of the sheets filled with starch-based and inorganic fillers.

Figure 11:
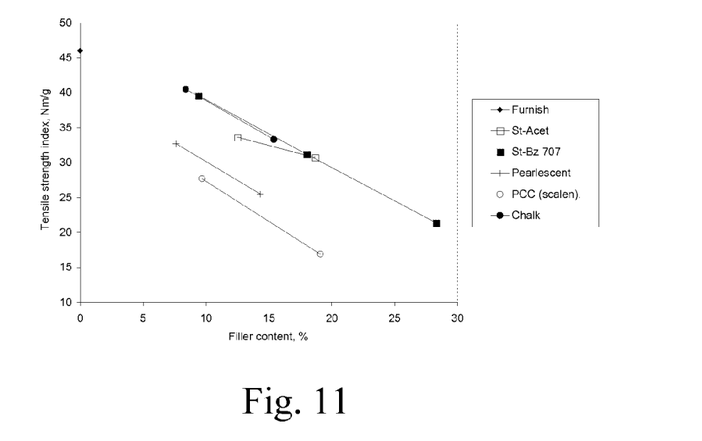
FIG. 11 shows the tensile strength index of the sheets filled with starch-based and inorganic fillers.

The tensile strength index of sheets with starch-based fillers was similar to that of chalk-containing sheets and higher than obtained with other inorganic fillers as indicated in FIG. 11 which indicates the tensile strength index of the sheets filled with starch-based and inorganic fillers as a function of filler content.

Figure 12:
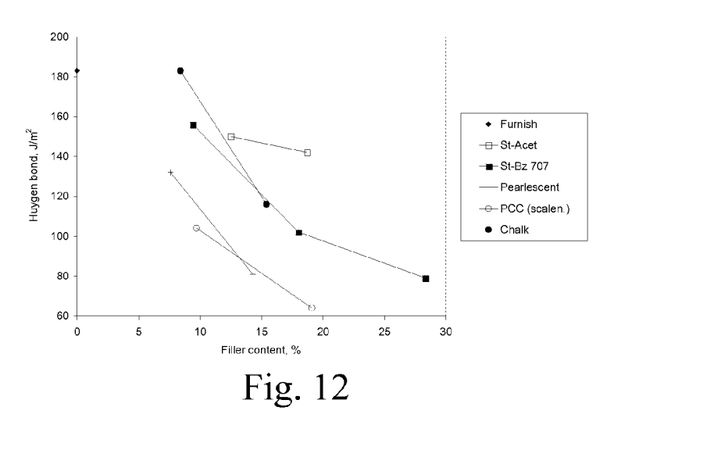
FIG. 12 denotes Huygen bond of the sheets filled with starch-based and inorganic fillers.

The bonding strength (Huygen bond) of sheets with starch-based fillers was comparable to the PCC-containing sheets. Especially at higher dosage levels, starch-based fillers gave improved internal bonding of the sheet structure compared to the inorganic fillers (FIG. 12—Huygen bond of the sheets filled with starch-based and inorganic fillers).

Example 10

Use of Dispersed Starch Benzoate as Paper Filler and Filled Paper Properties After Calendering Filled sheets were prepared according to Example 9, using starch benzoate filler (based on St-Bz 707) and commercial grades of a ground calcium carbonate (chalk), a scalenohedral precipitated calcium carbonate (PCC) and a titanium dioxide-coated mica (pearlescent) fillers. The sheets were calendered using a laboratory sheet calender using four nip passages with a heated roll surface temperature of 80° C., a speed of 35 m/min, and a linear load of 200 kN/m.

Figure 13:
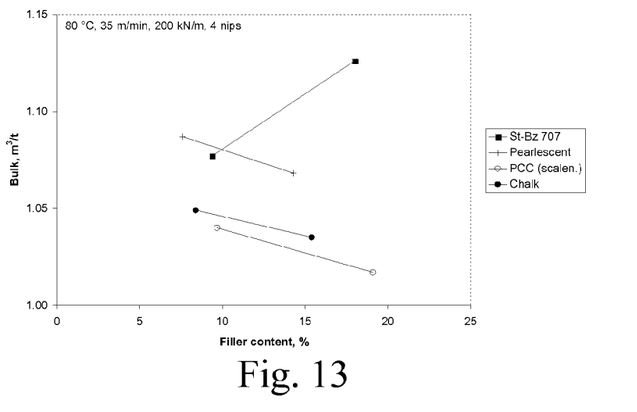
FIG. 13 shows the bulk of the calendered sheets filled with starch-based and inorganic fillers.

Calendering reduced the bulk of the sheets prepared with all types of fillers, less however of the sheets containing the pearlescent and the starch benzoate based fillers. FIG. 13 indicates the bulk of the calendered sheets filled with starch-based and inorganic fillers as a function of filler content.

Figure 14:
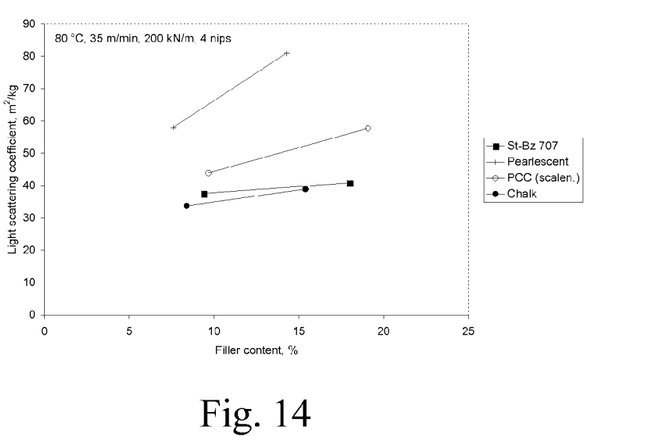
FIG. 14 shows the light scattering coefficient of the calendered sheets filled with starch-based and inorganic fillers.

The plasticization and permanent deformations of the sheet structure with starch-based filler can be observed in the changes of the sheet optical properties. Compared to the light scattering coefficients of the uncalendered sheets (FIG. 8), the most notable reduction due to calendering was observed for the sheets with starch-based filler as can be seen from FIG. 14 showing the light scattering coefficient of a number of calendered sheets filled with starch-based and inorganic fillers, respectively.

Figure 15:
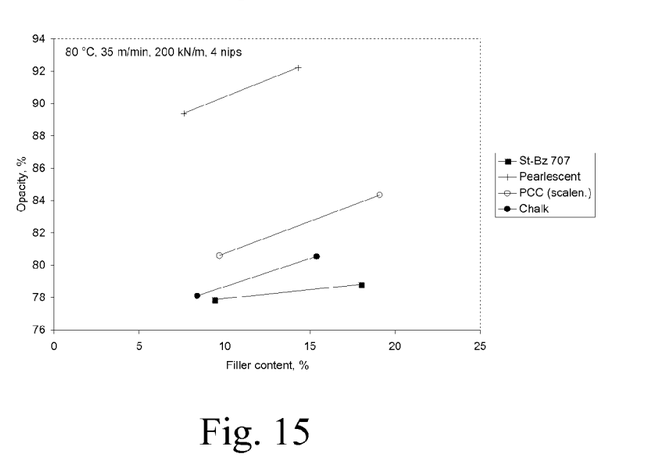
FIG. 15 indicates the opacity of calendered sheets filled with starch-based and inorganic fillers.

The calendering conditions employed also caused a reduction in the opacity of the sheets containing the starch-based filler. The results are indicated in FIG. 15 showing the opacity of calendered sheets filled with starch-based and inorganic fillers.

Figure 16:
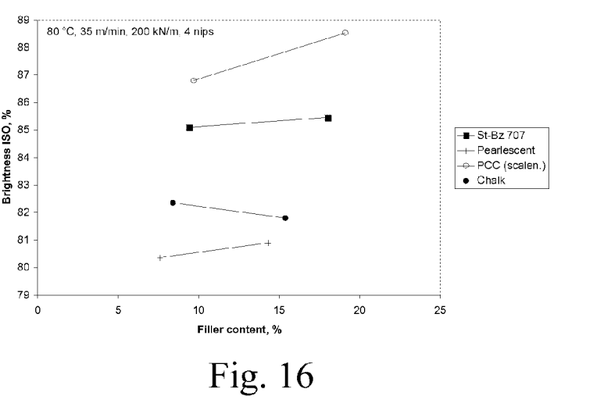
FIG. 16 shows ISO Brightness of calendered sheets filled with starch-based and inorganic fillers.

ISO Brightness of the calendered sheets was comparable to measured levels prior to calendering as will appear from the results summarized in FIG. 16.

Figure 17:
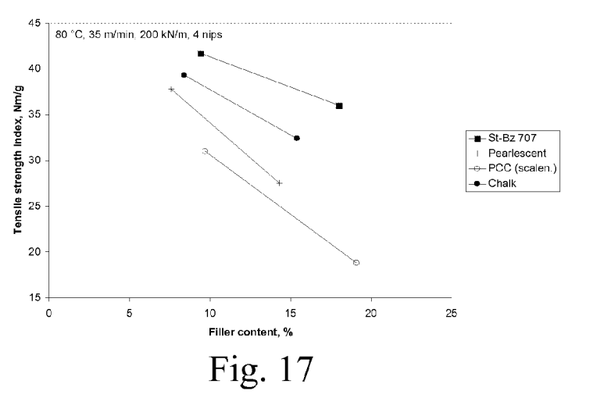
FIG. 17 indicates the tensile strength index of calendered sheets filled with starch-based and inorganic fillers.

The tensile strength of the sheets remained at relatively unchanged levels when compared to uncalendered sheet values, except the strength of the sheet with St-Bz 707 based filler was slightly improved in calendering as apparent from FIG. 17.

Figure 18:
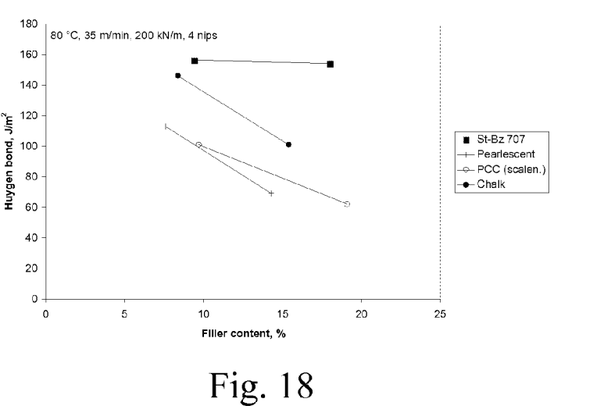
FIG. 18 shows Huygen bond of calendered sheets filled with starch-based and inorganic fillers.

Calendering seemed to improve the bonding strength (Huygen bond) of the sheets filled with higher dosage levels of the starch benzoate-based filler (FIG. 18).

Example 11

Spectroscopic Demonstration of Novel Organic Fillers in Paper Structure (e.g. for Authentication Applications)

The UV absorption spectroscopy can be used for detection of the novel aromatic substituted polysaccharide-based pigments and fillers in the paper structure. The spectral analysis should be made in the reflection mode.

Figure 19:
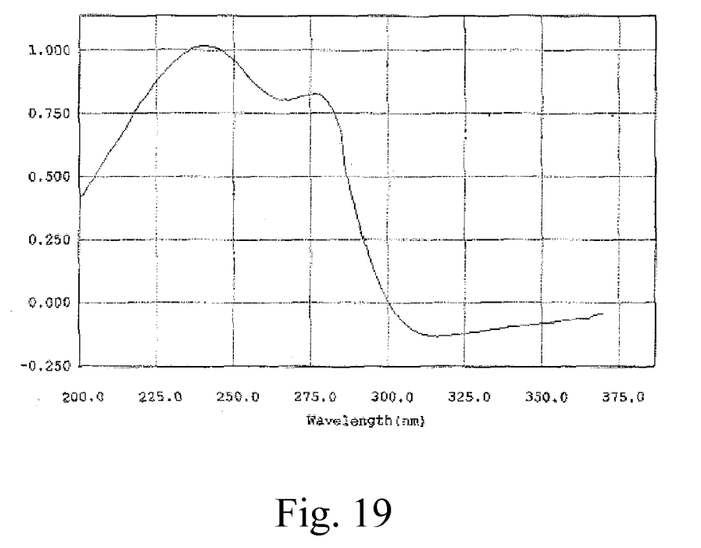
FIG. 19 indicates the UV absorption reflection analysis of dried starch benzoate filler (based on St-Bz 707) prepared according to Example 6.

The UV absorption reflection spectrum of dried starch benzoate filler (based on St-Bz 707) showed two absorption maxima at wavelengths 243 nm and 278 nm (FIG. 19). These correspond to the absorption maxima observed in solution for the starting starch benzoate (FIG. 1).

FIG. 19 depicts the results of a UV absorption reflection analysis of dried starch benzoate filler (based on St-Bz 707) prepared according to Example 7.

The furnish used for the sheets according to Example 9 did not exhibit UV absorption bands at the corresponding wavelength range. The UV absorption reflection spectra obtained for the paper sheets prepared according to Example 9 at dosage levels of 9 and 18 wt-% of St-Bz 707 based filler are given in FIG. 20. The sheets were not calendered. The filled sheets proved UV absorption of a lower intensity but at similar wavelengths as the pure filler, giving a possible demonstration method for the novel pigmenting materials. This characteristic spectroscopic response of the materials can be used e.g. for authentication applications.

Figure 20:
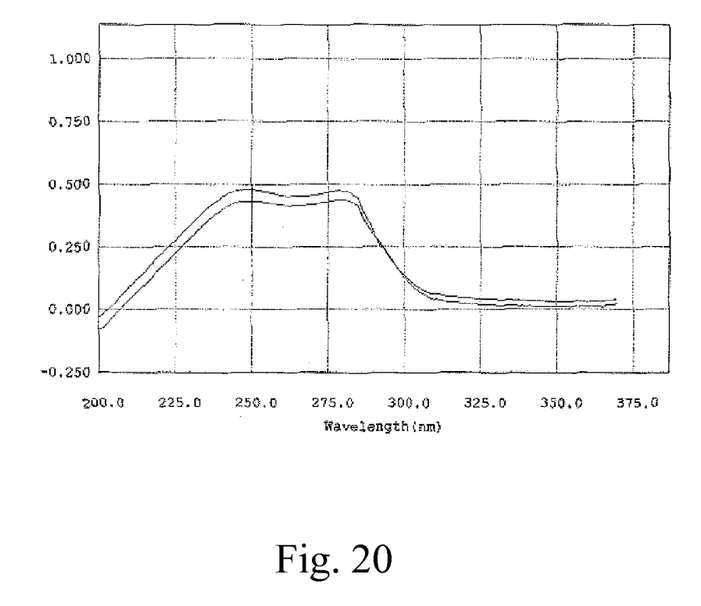
FIG. 20 is an UV absorption reflection analysis of paper sheets prepared according to Example 8, using starch benzoate filler (based on St-Bz 707) at dosage levels of 9 wt-% (lower spectrum) and 18 wt-% (upper spectrum)

FIG. 20 indicates the results of a UV absorption reflection analysis of paper sheets prepared according to Example 9, using starch benzoate filler (based on St-Bz 707) at dosage levels of 9 wt-% (lower spectrum) and 18 wt-% (upper spectrum).

The invention claimed is:

1. Particles of a polysaccharide derivative, having at least one substituent with conjugated unsaturated bonds and exhibiting an index of refraction in excess of 1.50, comprising a polysaccharide derivative selected from the group of esters or ethers of starch, cellulose, dextrin or a hemicellulose, wherein the substituent is selected from aromatic radicals having 6 to 18 carbon atoms, alicyclic groups having 6 to 12 carbon atoms and at least two conjugated unsaturated bonds, and linear or branched aliphatic hydrocarbyls having at least two conjugated unsaturated bonds, and mixtures of two or more, and wherein the polysaccharide comprises, in addition to a first substituent comprising the substituent with conjugated unsaturated bonds, a second substituent bonded by ester or ether bonds to the polysaccharide, wherein the second substituent comprises a hydrocarbyl radical derived from a $C_{2-20}$ aliphatic group.

2. The particles according to claim 1, suitable for filler use and having an average primary particle size of approximately 0.5 to 50 microns, in particular about 1 to 20 um, preferably about 1 to 15 um, and a pore size of 50 to 1000 nm, in particular 250 to 750 nm.

3. The particles according to claim 1, suitable for coating pigment use and having an average particle size of approximately 150 to 1000 nm, in particular about 250 to 500 nm.

4. The particles according to claim 1, comprising an ester or ether of starch or cellulose having a degree of substitution with respect to the substituent with conjugated unsaturated bonds of 0.1 to 3, preferably about 0.2 to 2.5, in particular about 0.25 to 2.

5. The particles according to claim 1, wherein the substituent is selected from the group of aryl groups with 1 to 3 fused or linked rings, optionally exhibiting 1 to 3 hetero atoms selected from oxygen, nitrogen and sulphur.

6. The particles according to claim 1, wherein the substituent is selected from benzoyl, naphthoyl, antracenoyl, stilbene and diphenyl, radicals derived from heterocyclic compounds, such as furan, coumarin, benzofuran, thiophene, pyridine and compounds and derivatives thereof.

7. The particles according to claim 1, wherein polysaccharide derivative exhibits a degree of substitution with respect to the second substituent of about 2.9 to 0.1, preferably about 2.8 to 0.5, in particular about 2.75 to 1.

8. The particles according to claim 1, wherein the polysaccharide derivative is essentially water-insoluble.

9. The particles according to claim 1, having a refraction index of at least 1.51, in particular 1.52 or more.

10. A method of producing particles according to claim 1, according to which method
a polysaccharide raw-material is provided,
the raw-material is suspended in an organic solvent to form a suspension,
the suspension is contacted with an organic reactant comprising a residue with conjugated unsaturated bonds,
the raw-material and the organic reactant are reacted at conditions conducive to the formation of an ester or ether bond between the raw-material and the residue with conjugated unsaturated bonds to form a polysaccharide derivative with substituents derived from the organic reactant,
the polysaccharide derivative is dissolved in a solvent to form a solution, and the solution is contacted with a non-solvent to precipitate particles of the polysaccharide derivative.

11. The method according to claim 10, comprising producing particles exhibiting an index of refraction in excess of 1.50, in particular 1.51 or 1.52 or more.

12. The method according to claim 10 or 11, comprising producing particles having an average particle size of approximately 0.5 to 50 microns, in particular about 1 to 20 um, preferably about 1 to 15 um, and a pore size of 50 to 1000 nm, in particular 250 to 750 nm.

13. The method according to claim 10, comprising producing particles having an average particle size of approximately 150 to 1000 nm, in particular about 250 to 500 nm.

14. The method according to claim 10, wherein the organic reactant is selected from the group of radicals having a leaving group and an aromatic residue of 6 to 18 carbon atoms, an alicyclic residue having 6 to 12 carbon atoms and at least two conjugated unsaturated bonds, or a linear or branched aliphatic hydrocarbyl residue having at least two conjugated unsaturated bonds, or mixtures of two or more.

* * * * *